United States Patent
Garlatti (10) Patent No.: US 9,085,846 B2
(45) Date of Patent: Jul. 21, 2015

(54) PLASTIC PULLEY FOR DRIVING DRUM FOR WASHING MACHINE INTO ROTATION

(75) Inventor: Walter Emilio Garlatti, Parma (IT)

(73) Assignee: MECCANICA GENERALE—S.R.L., San Paolo di Jesi (AN) (IT)

( * ) Notice: Subject to any disclaimer, the term of this patent is extended or adjusted under 35 U.S.C. 154(b) by 0 days.

(21) Appl. No.: 14/343,544

(22) PCT Filed: Sep. 13, 2011

(86) PCT No.: PCT/IT2011/000315
§ 371 (c)(1),
(2), (4) Date: Mar. 7, 2014

(87) PCT Pub. No.: WO2013/038432
PCT Pub. Date: Mar. 21, 2013

(65) Prior Publication Data
US 2014/0221140 A1    Aug. 7, 2014

(51) Int. Cl.
*F16H 55/36* (2006.01)
*D06F 37/30* (2006.01)
*F16H 55/48* (2006.01)

(52) U.S. Cl.
CPC ............. *D06F 37/30* (2013.01); *F16H 55/48* (2013.01)

(58) Field of Classification Search
CPC ... F16H 55/36; F16H 2055/366; F16H 55/44; F16H 15/126; F16H 55/48
USPC .................................................. 474/166, 152
See application file for complete search history.

(56) References Cited

U.S. PATENT DOCUMENTS

| | | | | | |
|---|---|---|---|---|---|
| 110,247 | A | * | 12/1870 | Kitson | 74/570.1 |
| 252,457 | A | * | 1/1882 | Hafner | 384/246 |
| 278,425 | A | * | 5/1883 | Fulton et al. | 474/166 |
| 280,228 | A | * | 6/1883 | Olsen | 474/166 |
| 421,669 | A | * | 2/1890 | Case | 474/174 |
| 512,822 | A | * | 1/1894 | Hoeft | 474/163 |
| 567,294 | A | * | 9/1896 | Corcoran | 474/152 |
| 580,291 | A | * | 4/1897 | Osmond | 74/594.2 |
| D29,524 | S | * | 10/1898 | Forg | D12/123 |

(Continued)

FOREIGN PATENT DOCUMENTS

| | | |
|---|---|---|
| EP | 2159314 A1 | 3/2010 |
| EP | 2177658 A1 | 4/2010 |
| WO | 2007057234 A1 | 5/2007 |

OTHER PUBLICATIONS

International Search Report for corresponding International Application No. PCT/IT2011/000315.

*Primary Examiner* — Henry Liu
(74) *Attorney, Agent, or Firm* — Egbert Law Offices, PLLC (57) ABSTRACT

A pulley comprising: a central hub; a peripheral crown; a first intermediate section comprising a plurality of radial ribs that radially extend from the hub, and a second intermediate section comprising a plurality of peripheral ribs that end into the peripheral crown and intermediate circular rib concentric with the center of the pulley and having a radius basically equal to half radius of the pulley, the circular intermediate rib separating the first intermediate section from the second intermediate section, the circular intermediate rib comprising connection points of radial ribs and of peripheral ribs, wherein the connection points of radial ribs are distant from those of the peripheral ribs; the peripheral ribs being suitably inclined mutually and with respect to the radial ribs in such way to intersect at least in one crossing point to form a web structure in the second intermediate section.

9 Claims, 5 Drawing Sheets

FIG. 3

(56) References Cited

U.S. PATENT DOCUMENTS

| | | | |
|---|---|---|---|
| 721,228 A * | 2/1903 | Philips | 474/166 |
| 740,445 A * | 10/1903 | Langerfeld | 474/152 |
| 962,620 A * | 6/1910 | Butler | 74/432 |
| 1,006,262 A * | 10/1911 | Noyes | 474/166 |
| 1,181,175 A * | 5/1916 | Shapiro | 474/151 |
| 1,421,708 A * | 7/1922 | Morgan et al. | 474/166 |
| 1,694,350 A * | 12/1928 | Bloss | 474/170 |
| 1,922,357 A * | 8/1933 | Divney et al. | 474/152 |
| 1,934,819 A * | 11/1933 | Rorabeck | 474/152 |
| 2,720,792 A * | 10/1955 | Zebley | 198/834 |
| 3,237,480 A * | 3/1966 | Phelon | 74/572.2 |
| 3,350,950 A * | 11/1967 | Gandrud | 474/152 |
| 3,416,385 A * | 12/1968 | Schenk | 474/162 |
| 3,635,099 A * | 1/1972 | Watson et al. | 474/174 |
| 4,058,023 A * | 11/1977 | Smith | 474/162 |
| 4,490,128 A * | 12/1984 | Weiss et al. | 474/166 |
| 4,559,028 A * | 12/1985 | Reeves, Jr. | 474/162 |
| 4,576,587 A * | 3/1986 | Nagano | 474/152 |
| 4,600,400 A * | 7/1986 | Hallerback | 474/166 |
| 4,631,974 A * | 12/1986 | Wiegand et al. | 74/450 |
| 4,632,153 A * | 12/1986 | Heller et al. | 139/449 |
| 4,929,220 A * | 5/1990 | Hosono et al. | 474/152 |
| 4,952,199 A * | 8/1990 | Saka et al. | 474/152 |
| 5,224,903 A * | 7/1993 | Langhof et al. | 474/152 |
| 5,573,461 A * | 11/1996 | Colford | 464/83 |
| 5,797,819 A * | 8/1998 | Arai | 474/161 |
| 5,980,407 A * | 11/1999 | Takamori et al. | 474/152 |
| 6,099,427 A * | 8/2000 | Brown | 474/188 |
| 6,139,456 A * | 10/2000 | Lii et al. | 474/152 |
| 6,817,959 B1 * | 11/2004 | Blaimschein | 474/152 |
| 6,881,166 B1 * | 4/2005 | Burkhardt et al. | 474/176 |
| 7,022,037 B2 * | 4/2006 | Valle | 474/152 |
| 7,435,197 B2 * | 10/2008 | Kamada | 474/152 |
| 7,819,766 B2 * | 10/2010 | Kennedy | 474/152 |
| 8,133,142 B2 * | 3/2012 | Gerlich et al. | 474/153 |
| 8,136,827 B2 * | 3/2012 | Lumpkin | 280/261 |
| 2002/0002092 A1 * | 1/2002 | Reguzzi | 474/152 |
| 2002/0086753 A1 * | 7/2002 | Yahata | 474/160 |
| 2003/0139240 A1 * | 7/2003 | Chen | 474/152 |
| 2004/0110590 A1 * | 6/2004 | Renshaw | 474/152 |
| 2005/0014590 A1 * | 1/2005 | Wen | 474/152 |
| 2005/0192146 A1 * | 9/2005 | Marten-Perolino et al. | 474/176 |
| 2005/0233850 A1 * | 10/2005 | Andel | 474/152 |
| 2006/0160647 A1 * | 7/2006 | Swane | 474/166 |
| 2006/0172841 A1 * | 8/2006 | San Miguel Nunez et al. | 474/156 |
| 2006/0205549 A1 * | 9/2006 | Nonoshita et al. | 474/160 |
| 2006/0211529 A1 * | 9/2006 | Vergara | 474/152 |
| 2006/0264286 A1 * | 11/2006 | Hodjat | 474/152 |
| 2007/0093329 A1 * | 4/2007 | Greppi et al. | 474/152 |
| 2007/0173364 A1 * | 7/2007 | Renshaw | 474/160 |
| 2007/0232427 A1 * | 10/2007 | Ueno et al. | 474/199 |
| 2011/0118067 A1 * | 5/2011 | Bronson | 474/166 |
| 2011/0300979 A1 * | 12/2011 | Dutil et al. | 474/166 |
| 2011/0312457 A1 * | 12/2011 | Wang | 474/152 |
| 2013/0116074 A1 * | 5/2013 | Lin | 474/152 |
| 2013/0143704 A1 * | 6/2013 | Blank et al. | 474/161 |

\* cited by examiner

PLASTIC PULLEY FOR DRIVING DRUM FOR WASHING MACHINE INTO ROTATION

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN SUBMITTED ON COMPACT DISC

Not applicable.

BACKGROUND OF THE INVENTION

1. Field of the Invention

A plastic pulley for driving drum for washing machine into rotation.

2. Description of Related Art Including Information Disclosed Under 37 CFR 1.97 and 37 CFR 1.98.

The present patent application for industrial invention relates to a plastic pulley for driving drum 1 for washing machine into rotation.

Figure 1:
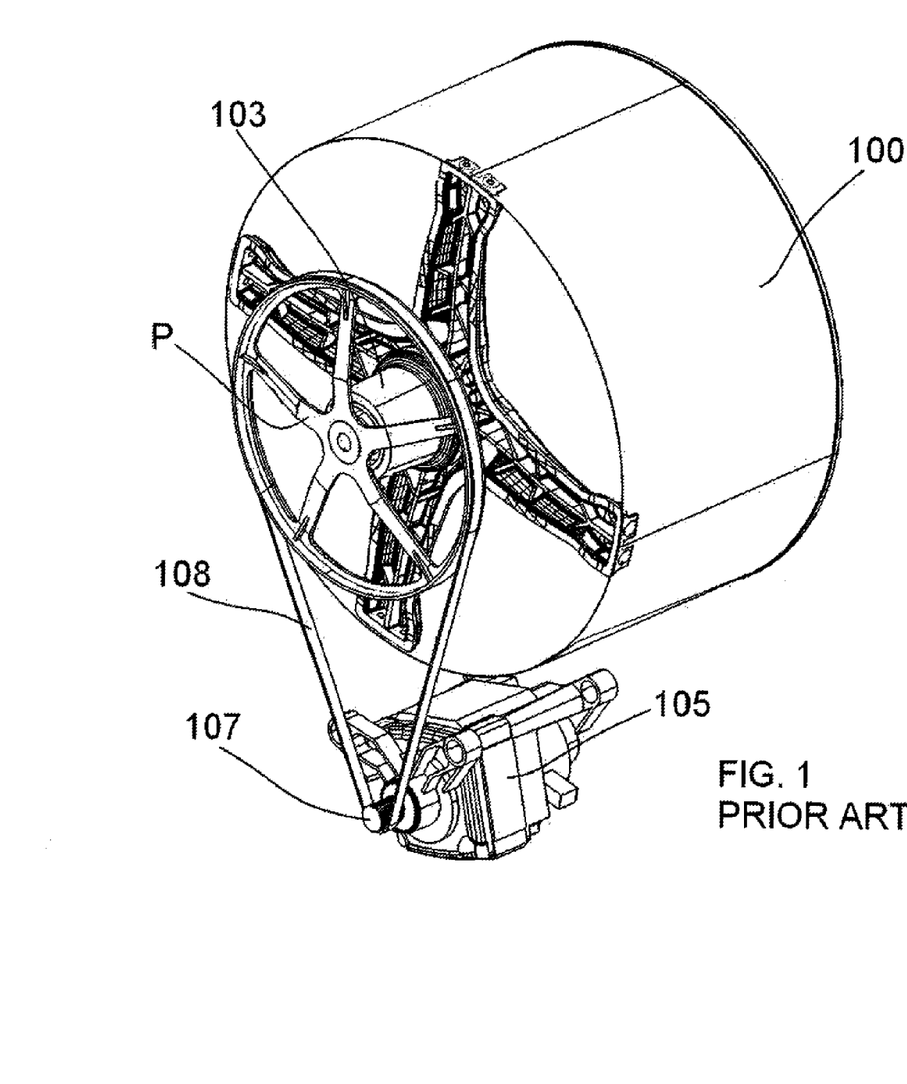
FIGS. 1 and 1A are perspective views, respectively showing a drum, pulley and motor assembly and a tub of washing machine according to the prior art.
Figure 1A:
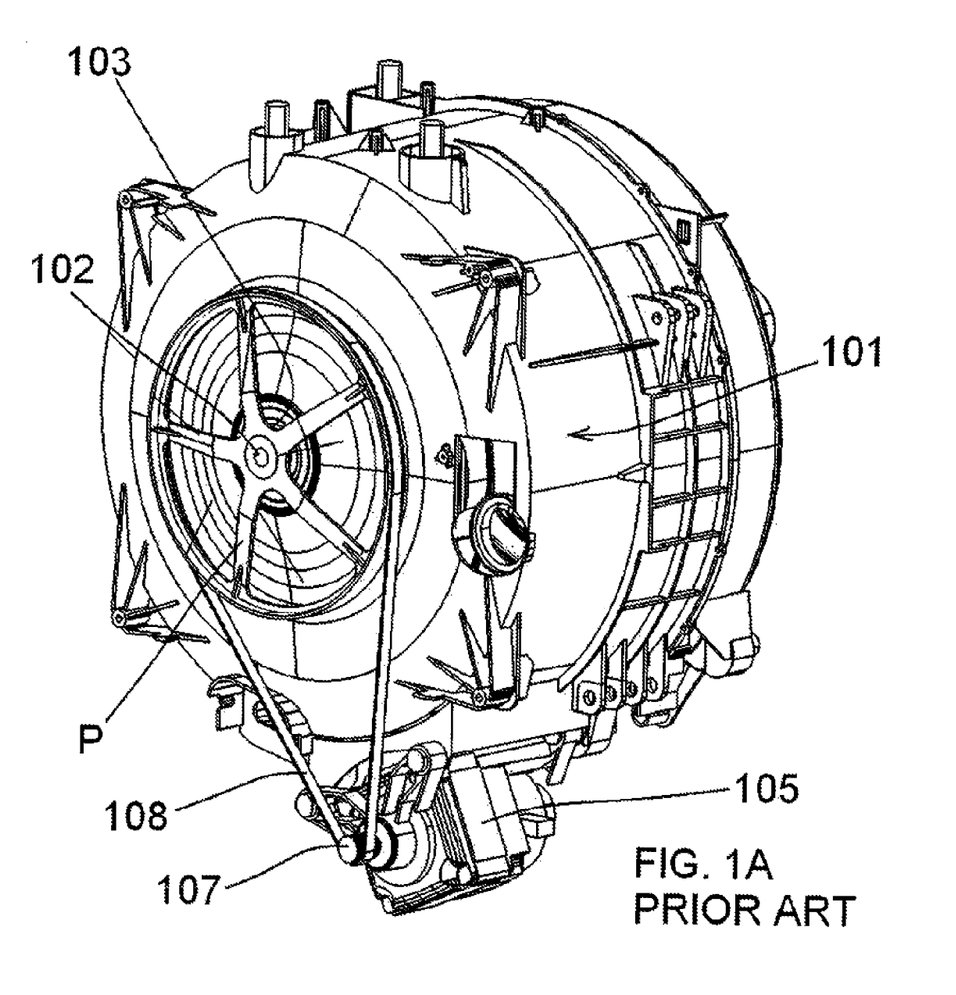

FIGS. 1 and 1A respectively show a drum, pulley and motor assembly and a tub of washing machine according to the prior art. The washing machine comprises a drum (100) to contain laundry. The drum (100) is revolvingly mounted inside a tub (101).

A shaft (102) fixed to the drum protrudes axially on the back of the drum. The shaft (102) of the drum is revolvingly mounted inside a bearing assembly (103) fixed to the hack wall of the tub (101).

A pulley (P) is splined on the shaft (102) of the drum. An electric motor (105) fixed to the tub (101) is used to drive the pulley (P) and the drum (100) into rotation. The electric motor (105) is provided with a drive shaft with pinion (107) that drives into rotation a belt (108) wound on the periphery of the pulley (P).

So the pulley (P) transfers the rotational torque of the motor (105) to the shaft (102) of the drum in order to rotate the drum (100) during washing cycles. It must be considered that current models of washing machines can be loaded with several kilograms of laundry, and therefore the drum (100) is subject to high weight, especially when laundry is soaked in washing water. Moreover, the rotational speed of the drum must be very high, since washing machines with spinning cycles higher than 1400 rpm are often required. Also, laundry takes irregular positions during the rotation of the drum (100), thus forcing inclination of shaft (102).

Evidently, the pulley (P) of the shaft of the drum is subject to high stress during operation of washing machine. Tension of belt (108), accelerations of motor (105), fixing system to shaft (102) and high temperature contribute to stress the pulley (P).

For this reason, pulleys of the shaft of the drum are generally made of high-resistance metal material. Nevertheless, such metal pulleys are impaired by some inconveniences caused by high costs.

In order to remedy said inconvenience at least partially, plastic pulleys have been devised, such as the one illustrated in patent application PCT WO2007/057234. Said plastic pulley is provided with traditional configuration, comprising a hub, a peripheral crown and a plurality of radially extending spokes that connect hub to peripheral crown. Evidently, such a pulley is not able to meet resistance requirements, unless it is made with high thickness. This would obviously result in increased volume and costs.

Patent application EP 2 159 314 discloses a plastic pulley for washing machine, provided with radial spokes originating from hub and branching of into a fork connected to external rim. In order to guarantee resistance of pulley, also according to this inventive solution, arms and forks have high width, with consequent material waste. Moreover, such a pulley is impaired by lack of stability, being subject to high torsional moment. These problems are solved by further increasing thickness and width of said arms and forks.

BRIEF SUMMARY OF THE INVENTION

The purpose of the present invention is to eliminate the inconveniences of the prior art, by providing a plastic pulley for driving a drum for washing machine into rotation, characterized by low thickness, low weight, low volume and low cost, being at the same time stable and reliable during operation.

Said purposes are achieved according to the present invention, with characteristics listed in independent claim 1.

Advantageous embodiments appear from the dependent claims.

Referring to FIGS. 1 and 1A, which illustrate a pulley (P) according to the prior art, the applicant has considered that the forces exerted on pulley (P) are: tension of belt (108) and starting torque of motor (105).

Tension of bell: bell must have suitable tension to prevent the belt (108) from skidding on the track of the pulley (P) during rotation. Said tension causes constant flexural force on pulley (P) during operation.

Starting torque: during washing cycles, the motor (105) repeatedly reverses the rotation direction, thus causing a starting torque that is transmitted to the pulley (P) as torque.

The plastic pulley of the invention comprises:
  central hub with hole or slot to spline a shaft of a drum of washing machine;
  peripheral crown with housing to receive a driving belt, said peripheral crown being provided with center and radius coinciding with center and radius of pulley;
  first intermediate section comprising a plurality of radial ribs that radially extend from hub, and
  second intermediate section comprising a plurality of peripheral ribs that end into said peripheral crown, said peripheral ribs being inclined with respect to radial ribs, characterized in that it comprises:
    circular intermediate rib concentric with center of pulley and provided with radius basically equal to half radius of pulley, said circular intermediate rib separating the first intermediate section from the second intermediate section, said circular intermediate rib comprising connection points of radial ribs and connection points of peripheral ribs, wherein said connection points of radial ribs are distant from said connection points of peripheral ribs;
    said peripheral ribs having suitable inclination both mutually and with respect to radial ribs, in such a way to intersect at least in one crossing point to form a web structure in said second intermediate section.

It must be considered that such a pulley has been designed according to principle of decomposition of the aforementioned forces, with geometry composed of two concentric areas disposed between hub and peripheral crown of pulley, wherein each concentric area is optimized for the load it is subjected to.

The two concentric areas are separated by the circular intermediate rib that acts as connection for all radial and peripheral ribs. Suitable inclination of peripheral ribs allows for crossing said ribs, forming a web structure in the second section of the pulley.

BRIEF DESCRIPTION OF THE DRAWINGS

Further characteristics of the invention will appear more evident from the detailed description below, which refers to a merely illustrative, not limiting embodiment, as shown in the enclosed drawings, wherein.

DETAILED DESCRIPTION OF THE INVENTION

Figure 2:
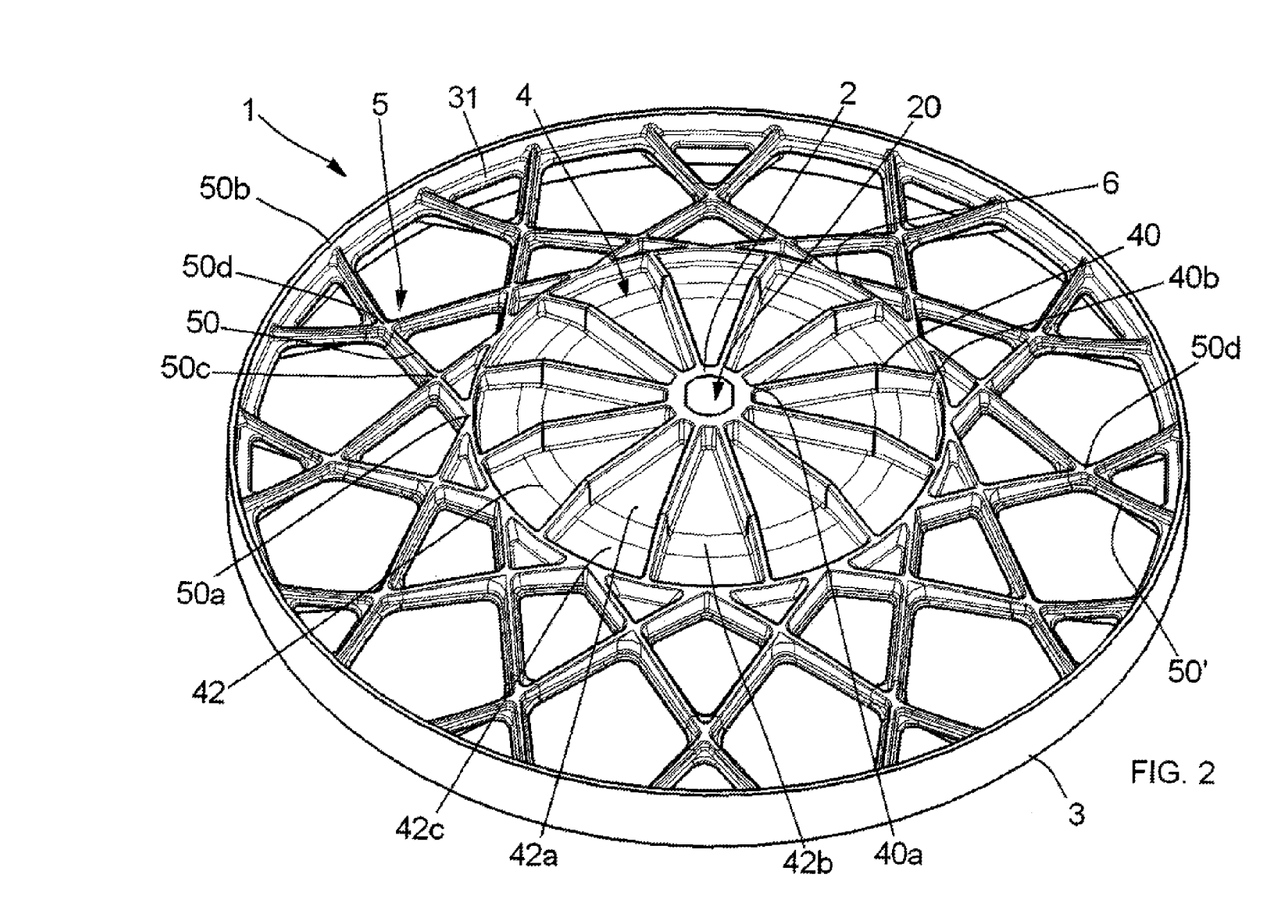
FIG. 2 is a perspective view of the front of the plastic pulley of the invention.
Figure 3:
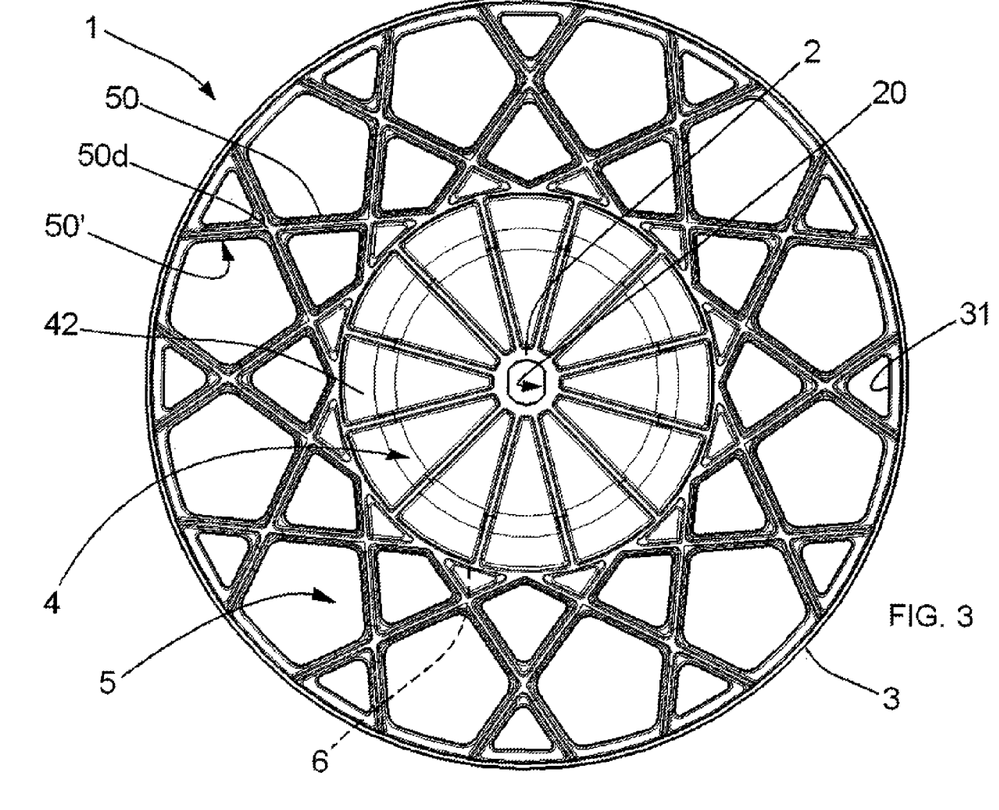
FIG. 3 is a plan view of the back of the pulley of FIG. 2.
Figure 4:
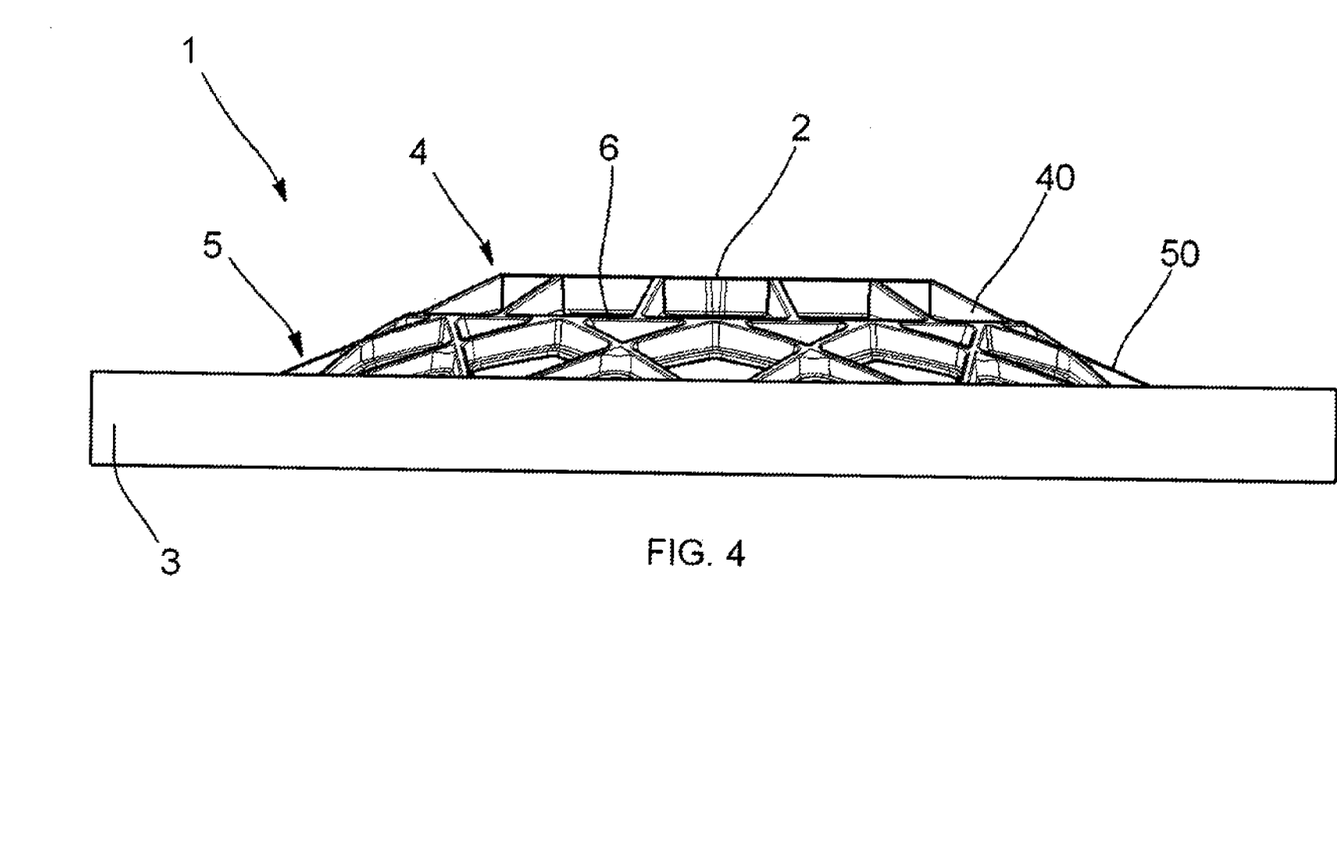
FIG. 4 is a side view of the pulley of FIG. 2.

Referring to FIGS. 2-4, the pulley of the invention is disclosed, being indicated as a whole with numeral (1).

The pulley (1) comprises:
a central hub (2) with hole or slot (20) to spline a shaft of a drum of washing machine; and
a peripheral crown (3) with housing to receive a driving belt.

The peripheral crown (3) is circular and defines the center and radius of the pulley (1).

Taper is defined between hub (2) and peripheral crown (3), meaning that the median plane of hub orthogonal to the axis of the pulley is spaced from the median plane of peripheral crown (3) orthogonal to the axis of the pulley, as shown in FIG. 4.

According to the invention, the pulley (1) comprises two concentric intermediate sections (4, 5) disposed between hub (2) and peripheral crown (3), separated by a circular intermediate rib (6) with radius basically equal to half radius of the pulley. So, the first intermediate section (4) is internal, being disposed between hub (2) and circular intermediate rib (6). The second intermediate section (5) is external, being disposed between circular intermediate rib (6) and peripheral crown (3).

The hub (2) transmits motion to the shaft and is therefore provided with a splitting seat (20) for coupling with shaft. For example, the splining seat (20) can be rectangular in order to be coupled with a rectangular section of the shaft.

The hub (2) is subject to cyclic and creep stress. Moreover, the hub (2) is subject to the compression force of a screw used to tighten the pulley on the shaft. For this reason, high thickness of plastic material is necessary, in order to distribute stress uniformly and reduce specific pressure. For illustrative purposes, the hub (2) is shaped as a cylindrical block, with thickness of approximately 18-14 mm, preferably 16 mm, and diameter of approximately 30-40 mm.

The first intermediate section (4) of the pulley is predominantly subject to flexural stress. For this reason, the first intermediate section (4) comprises a plurality of radial ribs or spokes (40) with low thickness. For example, each radial rib (40) has thickness of approximately 1.7-2 mm, preferably 1.7 mm. Twelve radial ribs (40) spaced by an angle of 30° can be provided.

Each radial rib (40) is provided with first end connected to the hub (2) in a connection point (40a) and second end connected to the circular intermediate rib (6) in a connection point (40b). So, the circular intermediate rib is provided with a plurality of connection points (40b) of radial ribs.

The circular rib (6) is concentric with center of pulley and has low thickness as radial ribs (40). The circular intermediate rib (6) connects the ends of all radial ribs (40) and separates first intermediate section (4) of pulley from second intermediate section (5) of pulley.

In the description below, the term 'back' refers to the side of pulley facing the bottom of tub, whereas the term 'front' refers to the side of pulley opposite the bottom of tub.

The pulley (1) is provided with a plastic plate (42) that extends completely on the first intermediate section (4), from hub (2) to circular rib (6), and can also extend partially on the second intermediate section (5). The plate (42) consists in a basically circular plate with low thickness of approximately 1.3-1.7 mm, preferably 1.5 mm. Radial ribs (40) and circular rib (6) extend on front of plate (FIG. 2). However, said ribs (40, 6) can extend on both sides of plate (42); or two plates can be provided, containing the ribs (40, 6) in sandwich configuration.

The circular rib (6) has constant vertical development of approximately 8 mm, with respect to front of plate (42). Radial ribs (40) have descending vertical development from hub (2) to periphery. Radial ribs (40) originate from hub (2) with vertical development of approximately 14 mm and end with vertical development of approximately 8 mm, in correspondence of the circular rib (6) to which they are connected in connection points (40b).

The function of the plate (42) is to increase torsional stability of the structure and allow for filling the product with low molding pressure. In the central part in the vicinity of the hub (2), the plate (42) allows for reducing the effects of torsional moment on radial ribs (40) with very low thickness, but high vertical development. So, flexion of radial ribs (40) in initial connection part to hub (2) can be reduced.

The geometry of the first intermediate section (4) is the best geometry to reduce weight of pulley and obtain a structure with low deformation for the special coning angle between external crown (3) and hub (2).

The plate has a basically flat central section (42a), a tapered intermediate section (42b) and a basically flat peripheral section (42c). The circular rib (6) is disposed between tapered intermediate section (42b) of plate and peripheral section (42c) of plate. So, taper is obtained between hub (2) and circular rib (6).

Moreover, the plate (42) can be provided with openings (43) (not shown in figures) that allow both for reducing weight of structure and ventilate area around hub (2). For this reason, the disposition and shape of the openings have been suitably studied to cause depression/pressure in rotation and extract/blow air during rotation of pulley (1). For example, each opening is disposed between two radial ribs (40) and shaped as a trapezoid or segment of circumference with decreasing dimensions from periphery to center.

In the second intermediate section (5) of pulley a plurality of peripheral ribs (50) is provided, originating from circular rib (6) and connected to peripheral crown (3).

Each peripheral rib (50) has a first end connected to circular rib (6) in connection point (50a) and a second end connected to peripheral crown (3) in connection point (50b). So, the circular intermediate rib (6) is provided with a plurality of connection points (50a) of peripheral ribs.

Connection points (50a) of peripheral ribs on circular rib (6) are distant from connection points (40b) of radial ribs on circular rib. Advantageously, each connection point (50a) of peripheral ribs is situated on the circular rib (6) in intermediate position between two connection points (40b) of radial ribs.

So, a plurality of stiffening points (connection points (40b) of radial ribs and connection points (50a) of peripheral ribs) is formed on circular rib (6), making circular rib (6) especially rigid and resistant to bending moment.

The function of circular rib (6) is to connect all radial ribs (40) and increase rigidity of pulley in the area with maximum torsional moment. Moreover, the circular rib provides solid anchoring to all peripheral ribs (50) that continue towards peripheral crown (3).

Peripheral ribs (50) are suitably inclined both mutually and with respect to radial ribs (40), in such a way that peripheral ribs cross at least in one crossing point (50c, 50d). So, a web structure of mutually crossing peripheral ribs (50) is obtained.

To that end, on the circular rib (6) from each connection point (50a) two peripheral ribs (50) originate, which are mutually inclined by angle higher than 90°. So, each peripheral rib (50) crosses at least with other two peripheral ribs in two crossing points (50c, 50d).

In the example of the Figures, the second intermediate section (5) of the pulley comprises 24 peripheral ribs (50) extending from circular intermediate rib (6) to peripheral crown (3). Accordingly, each peripheral rib is divided into three segments by two crossing points (50c and 50d).

To make the structure of pulley lighter while maintaining resistance, peripheral ribs (50) have section with T-shaped or trapezoidal or tapered section from back to front of pulley.

For illustrative purposes, peripheral ribs (50) have length approximately equal to length of radial ribs (40), equal to approximately 65-75 mm, preferably 70 mm.

Each peripheral rib (50) is provided with end (50') extending from second crossing point (50d) to peripheral crown (3). Said end (50') has higher reinforcement and is provided with a second T-shaped rib also extending from back of pulley. Crossings and divisions of peripheral ribs (50) allow for maintaining geometrical stability of pulley (1), minimizing deformation, and reducing stress caused by torsional moment to which the pulley is subject. The T-shaped or tapered section of peripheral ribs (50) provides a flowing 'channel' of plastic material, thus favoring filling of shape in mold with pressure lower than 100 bar. With sections other than "T", filling of shape in mold would be impossible at low pressure due to low thickness of ribs.

The peripheral crown (3) where the belt is housed, is made with reduced thickness, of approximately 2 mm. The crown (3) is provided with internal ring (31) connecting perpendicularly to crown to reduce radial deformation and allow for rigid connection of peripheral ribs (50) with crown.

As shown in FIG. 3, the back of pulley (1) is almost completely planar and deprived of protruding ribs in order to allow for correct assembly in the vicinity of tub, without interference with central area (hub) of bottom of tub containing bearing assembly.

The material of pulley (1) consists in a polymer with high elastic modulus. If the pulley is conductive, in order to ground electrostatic currents or currents of other type, a conductive material (conductive polymer, i.e. with carbon addition) can be used or a conductive element can be integrated, by means of overmolding or other techniques, connecting driven shaft with belt (which is conductive).

In order to make the structure lighter, filling 'channels' have been created from central area to peripheral area of pulley, taking advantage of the (overturned T or trapezoidal or tapered) shape of ribs of first intermediate section and second intermediate section. Such channels allow for working with low thickness and filling pressure wider 100 bar.

Injection of plastic material must be from center outwards, in order to orientate any charges of plastic material along lines with maximum mechanical stress.

Preferably, moldable plastic material with mineral or synthetic charges is used, such as glass fibers in percentage from 50 to 70%, preferably 65%. Preferably, plastic material is plastic material with elastic modulus higher than 14,000 MPa, such as polyamide (PA), polypropylene (PP), polyethylene (PET), polyphenylene sulphide (PPS) or polyetheretherketone (PEEK).

Several changes may be made the present embodiment of the invention, within the reach of an expert of the field, without departing from the scope of the present invention as defined in the accompanying claims.

The invention claimed is:

1. A plastic pulley for driving a drum for a washing machine into rotation, the plastic pulley comprising:
   a central hub with a hole or slot to spline a shaft of a drum of washing machine;
   a peripheral crown with a housing to receive as driving belt, said peripheral crown being provided with center and radius coinciding with center and radius of the pulley;
   a first intermediate section comprising a plurality of radial ribs extending radially from the hub; and
   a second intermediate section comprising a plurality of peripheral ribs ending in said peripheral crown, said peripheral ribs being inclined with respect to radial ribs;
   wherein the pulley comprises:
   a circular intermediate rib concentric with center of the pulley and provided with radius substantially equal to half radius of pulley, said circular intermediate rib separating the first intermediate section from the second intermediate section, said circular intermediate rib comprising connection points of the radial ribs and connection points of the peripheral ribs, wherein said connection points of the radial ribs are distant from said connection points of the peripheral ribs;
   said peripheral ribs having suitable inclination both each other and with respect to the radial ribs, in such way that said peripheral ribs intersect each other at least in one crossing point to form a web structure in said second intermediate section.

2. The pulley of claim 1, wherein each connection point of the peripheral ribs is situated on the circular intermediate rib in intermediate position between two connection points (40b) of the radial ribs.

3. The pulley of claim 1, wherein two peripheral ribs with mutual inclination originate from each connection point of the peripheral ribs on the circular rib.

4. The pulley of claim 3, wherein two peripheral ribs originate from each connection point of the peripheral ribs on the circular rib, being mutually inclined by angle higher than 90°, in such way that each peripheral rib crosses at least two peripheral ribs in two crossing points.

5. The pulley of claim 1, wherein the pulley comprises at least one plate comprising of a substantially circular plate that covers said first intermediate section of the pulley and extends from the hub to the circular intermediate rib.

6. The pulley of claim 5, wherein said plate comprises at least one tapered section, in order to obtain taper between the hub and the circular intermediate rib.

7. The pulley of claim 5, wherein said plate comprises a plurality of openings situated between said radial ribs for air ventilation.

8. The pulley of claim 1, wherein said peripheral ribs have T-shaped or tapered section from back to front.

9. The pulley of claim 1, wherein the pulley is made of plastic material with elastic modulus higher than 14,000 MPa, charged with mineral or synthetic charges in percentage from 50 to 70%, preferably 65%.

* * * * *